United States Patent [19]

Yamaguchi et al.

[11] Patent Number: 4,580,774

[45] Date of Patent: Apr. 8, 1986

[54] SHEET MATERIAL ACCUMULATING DEVICE

[75] Inventors: Toshimitsu Yamaguchi; Kaoru Tamura, both of Kanagawa, Japan

[73] Assignee: Fuji Photo Film Co., Ltd., Kanagawa, Japan

[21] Appl. No.: 547,614

[22] Filed: Nov. 1, 1983

[30] Foreign Application Priority Data

Nov. 2, 1982 [JP] Japan .................. 57-193086

[51] Int. Cl.⁴ ............................................. B65H 43/00
[52] U.S. Cl. ..................................... 271/176; 271/81; 271/84; 271/199; 271/200
[58] Field of Search ................. 271/176, 199, 200, 84, 271/81

[56] References Cited

U.S. PATENT DOCUMENTS

| Re. 19,254 | 7/1934 | Rich | 271/84 |
| 591,223 | 10/1897 | North | 271/81 |
| 1,983,708 | 12/1934 | Ruble | 271/84 X |
| 2,576,204 | 11/1951 | Allen | 271/81 |
| 3,469,836 | 9/1969 | Javid | 271/199 X |
| 3,567,047 | 3/1971 | Clausen | 271/176 X |

*Primary Examiner*—Richard A. Schacher
*Attorney, Agent, or Firm*—Sughrue, Mion, Zinn, Macpeak and Seas

[57] ABSTRACT

A sheet material accumulating device includes a sheet transporting section which is arranged to receiver sheets from a sheet feeding station at a feeding speed and to transport the received sheets to a slanted guide plate of an accumulating section, where the sheet transporting section releases the sheets to thereby accumulate the sheets on the guide plate. The transport speed and direction of the transporting section is controlled so that the sheet reaches the guide plate at a desired position and speed and is released from the transporting section by moving the sheet transporting section away from the guide plate, toward the sheet feeding station.

5 Claims, 16 Drawing Figures

SHEET MATERIAL ACCUMULATING DEVICE

BACKGROUND OF THE INVENTION

The present invention relates to a sheet material accumulating device and particularly to a sheet material accumulating device in which sheet materials which are likely to be damaged, are accumulated in such a manner that rubbing contact between sheets is substantially eliminated.

There has been proposed an apparatus by which a radiation image of the human body or the like is recorded onto a stumulable phosphor plate and the image information recorded thereon is read out by means of a laser scanner or the like and then a visible image is reproduced by exposing a recording medium, such as a photosensitive film or the like to a modulated light beam carrying the image information recorded the stumulable phosphor plate. In such a picture image forming apparatus, the stimulable phosphor plate for image storage is generally in sheet form. After these phosphor sheets have been exposed to radiation images, they are fed into a sheet supply section of a radiant image reading machine. This feeding operation may be accomplished manually or with the use of a transport system such as a conveyer. The phospor sheets are then automatically fed, one by one, into a reading section from the sheet supply section. In many cases, and particularly in the case of a medical care/diagnostic apparatus, the photographing of radiation images is performed aperiodically. Therefore, even in the case where a radiation lay image photgraphing device and a radiation picture image reading device are coupled to each other through a sheet transport system, it is preferable to arrange the entire device such that the photographing device and the image reading device are not directly coupled. Rather, it is preferable to store the phospor sheets at a sheet receiving position before they are transported to the image reading device. Generally, the stored phosphor sheets are transported in groups, from the sheet receiving position into a sheet transfer position. From there the phosphor sheets are fed, one by one, to the image reading section from the transfer position. If the sheet feed is performed in this manner, it is possible to cause the radiation image reading device to operate with its running cycle completely independent of the timing of the phosphor sheet feeding mechanism of the radiation image photographing device. Further, if such a sheet feed system as mentioned above is employed, even in the case where a fault occurs in the radiation image reading device or in the case where the radiation image photographing device temporarily feeds a number of phosphor sheets beyond the processing capacity of the radiation image reading device, it is not necessary to immediately stop the radiation image photographing device, for it is possible for the image photographing device to continue operating an additional period of time.

When sheet materials are accumulated at a sheet receiving position, thesheet receiving device has been conventionally operated to receive aperiodically fed sheet materials and accumulate them in such a manner that they are caused to successively stand along a slanted guide plate.

In the conventional accumulating device of this type, however, there is the problem that since newly fed sheet material is fed onto sheet materials which have previously been accumulated, that is, the already accumulated sheet materials serve as a guide plate for a newly fed sheet, the sheet materials may be damaged, especially if the sheet materials are likely to be damaged as are the above-mentioned phosphor sheets. This problem is more significant in the case where a sheet material is curled.

Further, when using the conventional sheet accumulating device, in the case where various sheet materials of different sizes are to be accumulated, there often occurs the problem that with sheet material which is shorter in its longitudinal direction, the sheet material may hit a sheet receiver with a shock larger than that produced by a longer sheet, with the result that it may be damaged or improperly stacked on the sheet receiver thereby causing an irregularly stacked accumulation of sheet materials.

SUMMARY OF THE INVENTION

The present invention has the purpose of overcoming the above-mentioned problems.

It is an object of the present invention to provide a sheet material accumulating device in which the above-mentioned problems associated with conventional sheet material accumulating device are solved.

It is another object to provide a sheet material accumulating device in which mutual rubbing and the free fall of sheet material are substantially avoided so as to prevent damage to sheet materials.

A further object is to provide a sheet material accumulating device capable of accumulating different sized sheet materials into a predetermined position.

The above-mentioned objects of the present invention are attained by a sheet material accumulating device for accumulating sheet materials, which are fed at given intervals, in a manner so that the sheet materials are caused to stand one by one along a slanted guide plate, and characterized in that there is provided sheet material receiving means which is arranged such that the sheet material receiving means receives the fed sheet materials at the transporting speed of the sheet materials, transports the received sheet material along the guide plate into an accumulating position, and then comes back, while discharging the sheet materials, to a sheet material receiving position.

DETAILED DESCRIPTION OF THE PREFERRED EMBODIMENT

Figure 1:
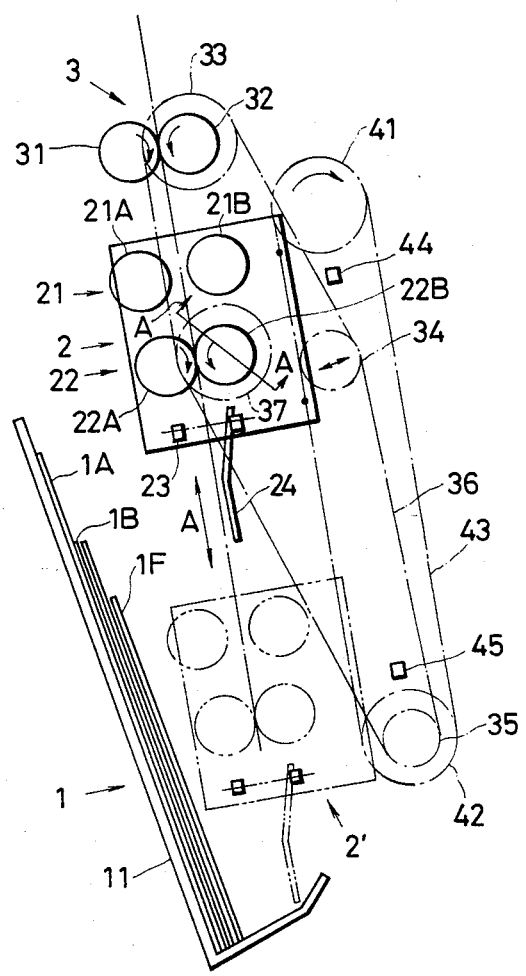
FIG. 1 is a side view illustrating a preferred embodiment of the present invention.

FIG. 1 is a side view illustrating a main portion of a device for accumulating sheet materials (hereinafter simply referred to as "sheet"). In FIG. 1, reference numerals 1, 2 and 3 designate a sheet accumulating section, a sheet transporting unit, and a pair of feed rolls, respectively. The sheet accumulating section 1 is constituted by a L-shaped sheet receiver 11 for accumulating sheets 1A, 1B, . . . of various sizes in the slanted state, as shown in the drawing. The sheet transporting unit 2 is arranged to operate to receive a sheet fed through the feed roll pair 3 from a sheet feed section (not shown) and to then transport the received sheet to a position near the bottom of the sheet receiver 11 of the sheet accumulating section 1. To this end, the sheet transporting unit 2 is arranged so as to be capable of reciprocating along a guide rail (not shown) between a position 2' at which sheets are received and another position 2" at which the received sheets are transferred to the sheet receiver 11.

Figure 2:
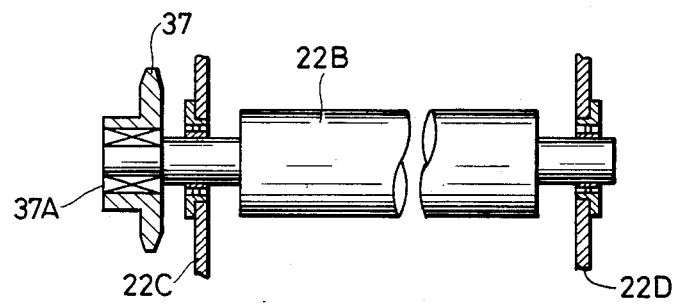
FIG. 2 is a cross-section of the device of FIG. 1 taken along section line A—A.

The arrangement of the sheet transporting unit 2 will now be described in detail with reference to FIGS. 1 and 2. The unit 2 is fixed to a chain 43 positioned over a sprocket 41, which is rotationally driven by a motor $M_1$ (not shown) and a driven sprocket 42 so that the unit 2 is reciprocated along the above-mentioned guide rail in the direction of arrow A as the motor $M_1$ rotates forward and backward. Two pair of rolls 21A, 21B and 22A, 22B are provided in the sheet transporting unit 2. The roll pair 21 consisting of the rolls 21A and 22B are arranged to operate so as to guide a sheet fed through the above-mentioned feed roll pair 3 from the upper portion in the drawing to the roll pair 22 consisting of the rolls 22A and 22B. Each of the rolls 21A and 21B is rotatably supported and the rolls 21A and 21B are separated relatively wider than the thickness of a sheet, while the roll pair 22 are arranged such that the roll 22B which is one of the rolls constituting the roll pair 22 is connected through a one-way rotating clutch 37A to a driven sprocket 37 which is engaged with a chain 36 wrapped about driven sprockets 34 and 35 and a sprocket 33 rotationally driven by a motor $M_2$ (not shown) for causing the above-mentioned feed roll pair 3 to rotate in the direction of the arrow in the drawing. This state is shown in FIG. 2 (which is a cross-section taken across the line A—A in FIG. 1). Reference numerals 22C and 22D designate side plates of the sheet transporting unit 2. Thus, the above-mentioned roll pair 22 have two functions; one is to receive a sheet, at the feeding speed of the sheet fed by the feed roll pair 3 as the motor $M_2$ rotates, and the other is to transport the received sheet, when it has been released from the feed roll pair 3, so that the sheet is slidable in the direction opposite to the above-mentioned feed direction. The other roll 22A of the roll pair is urged by a spring against the roll 22B. The driven sprocket 34 functions to automatically adjust the tension of the chain 36 which changes as the sheet transporting unit 2 moves. The sheet transporting unit 2 comprises a guide plate 24, a sheet detector 23 composed of a light emitter and a light receiver, etc., in addition to the above-mentioned roll pairs 21 and 22. Reference numerals 44 and 45 designate upper and lower limit position detectors for detecting the fact that the sheet transporting unit 2 has reached the upper and lower limit positions, respectively, in the above-mentioned reciprocating operation of the unit 2.

The operation of the thus arranged device according to the present invention will now be described.

Figure 3:
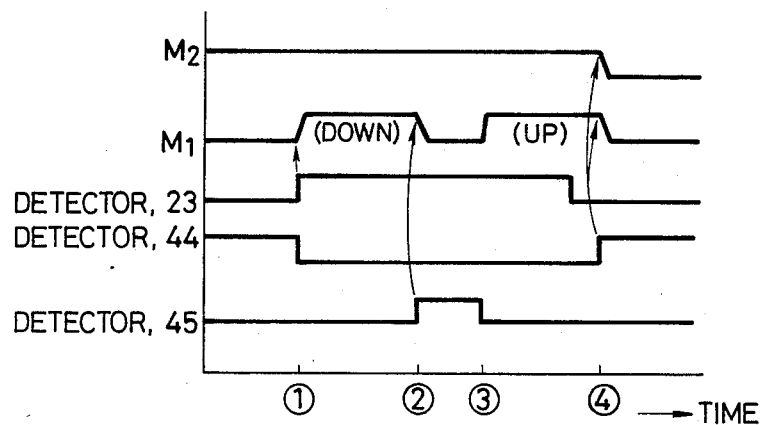
FIG. 3 is a time chart showing the timing of the operations performed by the embodiment of FIG. 1.

FIG. 3 is a time chart showing the operation of the device according to the present invention. FIGS. 4A–4F illustrate the device of the invention at various stages of operation. Assume that the feed roll pair 3 are being driven by the motor $M_2$ in response to a sheet approach signal or the like. As the feed roll pair 3 are being driven, the driven roll 22B connected to the feed roll pair 3 through the chain 36, the sprocket 37 and the one-way rotating clutch 37A is in a state where is is rotated in its feeding direction within the traveling speed of the chain 36.

Figure 4:
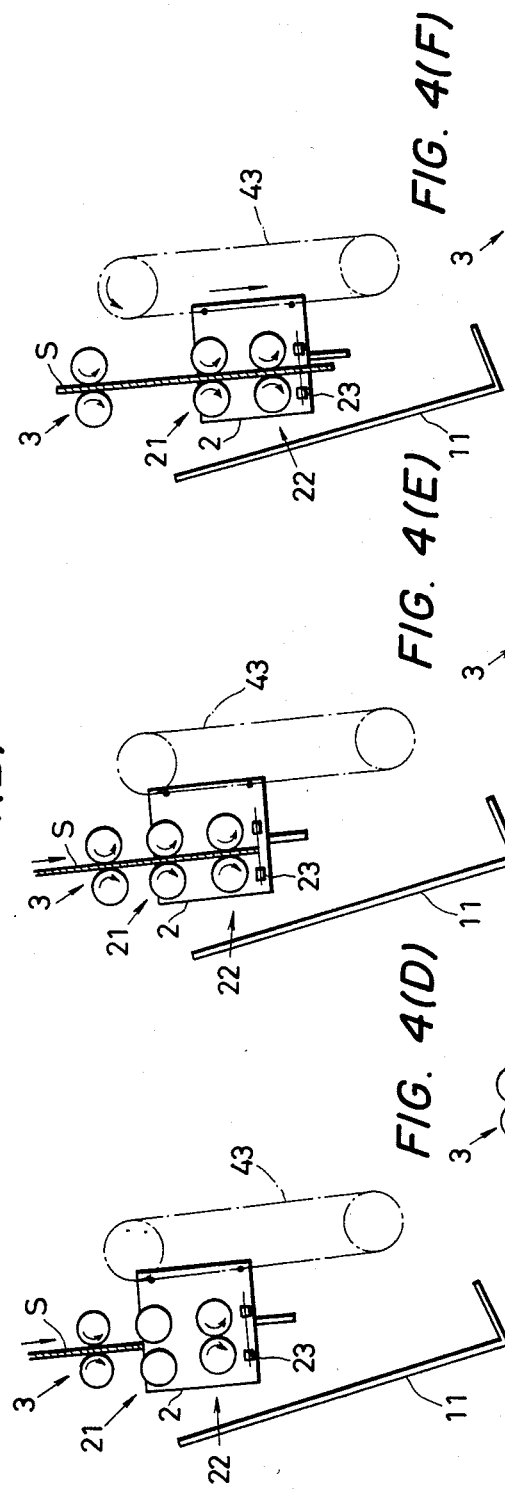
FIGS. 4(A) to (F) are diagrams illustrating particular operations of the embodiment of FIG. 1.

If a sheet S is fed into the device according to the present invention from sheet supply section (not shwon), it is received by the feeding roll pair 3 and fed into the nip between the guide rolls 21A and 21B of the sheet transporting unit 2 (FIG. 4(A)). When the sheet S reaches the driven transporting roll pair 22 of the sheet transporting unit 2, the sheet S is fed by the feed roll pair 3 and the driven transporting roll pair 22 at a feed speed defined by the feed roll pair 3. This is because the rotating speed of the sprocket 37 is designed to be equal to or slightly higher than that of the feed roll pair 3 and the driven transporting pair 22 are arranged to be able to slip in the reverse direction (FIG. 4(B)).

When the sheet S is detected by the sheet detector 23, the motor $M_1$ starts to rotate (at the time 1 in FIG. 3) to cause the sheet transporting unit 2 to move downward. Also during this portion of the operation, the sheet S is fed at the feed speed defined by the feed roll pair 3. That is, the traveling speed of the sheet transporting unit 2 is absorbed by the above-mentioned one-way rotating clutch 37A (FIG. 4(C)). When the back end of the sheet S has come out of the feed roll pair 3, the sheet S is further fed downward at a speed approximate to the difference between the speed of the sheet transporting unit 2 as it descends and the speed of the chain 36 (FIG. 4(D)).

When the sheet transporting unit 2 has reached its lower most position and this fact is detected by the above-mentioned detector 45, the motor $M_1$ is stopped (at the time 2 is FIG. 3) so that the descent of the sheet transporting unit 2 is terminated and a timer (not shown) is started. When the timer has timed out, the motor $M_1$ is started to rotate (at the time 3 in FIG. 3) in a direction reverse to the previous rotation so as to start the upward movement of the sheet transportiong unit 2 (FIGS. 4(E) and (F)). When the sheet transporting unit 2 is at a stand-still, the sheet S is fed down at a speed approximately equal to the speed of the chain 36, while when the sheet 2 moves upward, the sheet S is fed down at a speed approximately equal to the sum of the ascending speed of the sheet transporting unit 2 and the traveling speed of the chain 36.

In the above description, the transport speed of the sheet S has been explained such that it is approximately equal to the difference between the descending speed of the sheet transporting unit 2 and the traveling speed of the chain 36 in the stage shown in FIG. 4(D), while it is approximately equal to the sum of the ascending speed of the sheet transporting unit 2 and the traveling speed of the chain 36 in the stage shown in FIG. 4(F). It should be noted that the above-mentioned speed of the sheet S is that relative to the sheet transporting unit 2, while the sheet S is fed at a speed, relative to the sheet receiver 11, which is equal to the speed of the feed roll pair 3 or the speed of the chain 36 (actually, the speed of the driven roll pair 22 driven by the chain 36), there being no significant difference between these two speeds. After the sheet S is also fed to the bottom of the sheet receiver 11, the speed of the sheet S relative to the sheet receiver 11 becomes zero through slipping of the one-way rotating clutch 37A.

As described above, as the sheet transporting unit 2 moves up, the sheet S carried and transported downward by the sheet transporting unit 2 is released from the roll pair 22, in the manner that a small sized sheet is released faster than a large sized sheet. Thus it is possible to accumulate the sheets without free fall, even with respect to a small sized sheet, so that sheet damage can be prevented.

After the time at which a sheet S of the largest size to be handled is to be released, the sheet transporting unit 2 reaches its upper limit position, and upon the detection of the this fact by the above-mentioned detector 44, both the motors $M_1$ and $M_1$ are stopped (at the time 4 in FIG. 3) so that the upward movement of the sheet transporting unit 2 is terminated as is the rotational drive for the feed roll pair 3 and the driven roll pair 22 of the sheet transporting unit 2. The rotational drive for the feed roll pair 3 and the driven roll pair 22 of the sheet transporting unit 2 are restarted in response to a next sheet approach signal or the like.

In the above-described embodiment, the rotation of the motor $M_2$ is stopped when the detector 44 detects the sheet transporting unit 2. It is possible to adjust the timing at which the forward end of a sheet S comes into contact with the sheet receiver 11 using the method described hereunder, where the timing at which the motor $M_2$ is to be stopped is set to be in advance of the timing at which the sheet transporting unit 2 begins to move upwardly. For example, in the case where the motor $M_2$ is caused to stop before the sheet transporting unit 2 begins to move upwardly, as the sheet transporting unit 2 ascends, the sprocket 37 engaged with the driven roll pair 22 rotates in the direction to feed the sheet S downwardly along the chain 36. It is to be understood that if the diameter of the driven roll 22B is larger than that of the pitch circle of the sprocket 37, the sheet S is fed downwardly in spite of the upward movement of the sheet transporting unit 2, while if the diameter of the driven roll 22B is smaller than that of the pitch circle of the sprocket 37, the sheet S is fed upwardly as the sheet transporting unit 2 moves up. Accordingly, by suitably selecting the diameters of the driven roll 22B and the pitch circle of the sprocket 37, it is possible to adjust the timing at which the forward end of a sheet S comes into contact with the receiver 11.

The embodiment described above, provides the advantages that sheet fed from a sheet feed section are received at the speed at which they are fed by the feed section and are accumulated on a sheet receiver without rubbing each other. In addition, even differently sized sheets can be reliably accumulated without free fall thereby reducing damage to the sheets.

Although the sheet receiver 11 is fixed in the above-described embodiment, it is possible, as the inventors of the present application have proposed in U.S. patent appln. Ser. No. 405,607, to divide the sheet receiver into a slanted plate and a support, so that the support is combined with a second slanted plate provided at a position separated from the first-mentioned slanted plate to thereby cause the accumulated sheets to move from a first accumulating section to a second accumulating section. Further, in this case, it is possible to place the second accumulating section at a position advantageous to the next step in which the sheets are taken out, as described hereunder.

Figure 5:
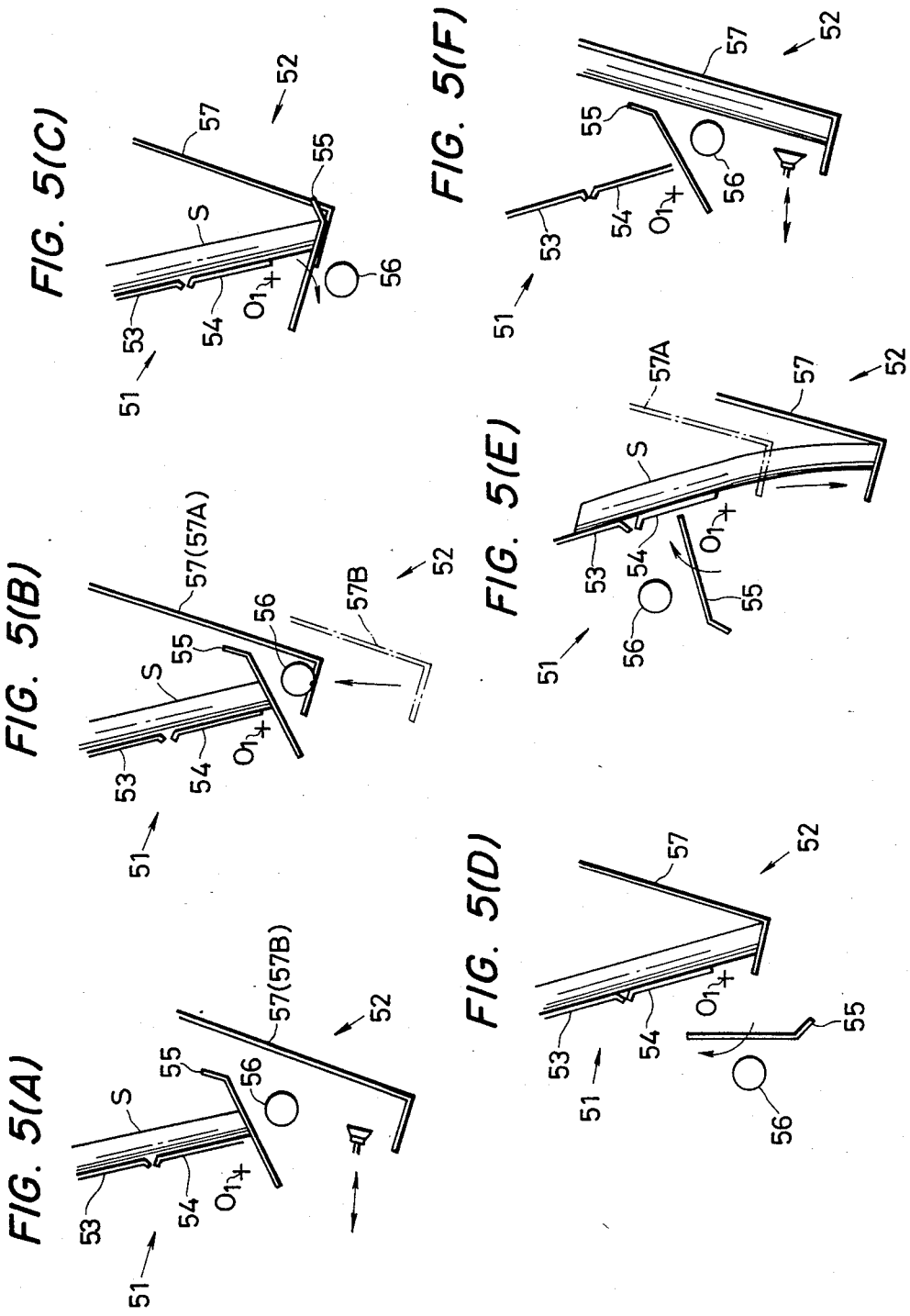
FIGS. 5(A)–5(F) are diagrams illustrating the details of one embodiment of a sheet accumulating section for the device of the invention and the positions of the sheet accumulating section at various stages of its operation.

FIG. 5(A) is a schematic diagram of a sheet accumulating drive having two accumulating sections as described above. In the drawing, a first accumulating section 51 is composed of a fixed slanted-plate 53, a sheet transfer auxiliary plate 54 provided pivotally about a pivot center $O_1$, a support 55, and a sheet transfer auxiliary roll 56. A second accumulating section 52 is composed of an accumulation support 57 which is arranged to be reciprocated between a first position 57A in which the sheet S is received and a second position 57B opposed to a sheet take-out means for taking out the sheet S (only a suction which is a main part of the sheet taking-out means is shown in the drawing). As will be described hereunder in detail, the pivotal support 55, the sheet transfer auxiliary roll 56 and the accumulation support 57 of the second accumulating section are arranged in a digital manner, that is, in the shape of the teeth of a comb so that they can pass each other. When the teeth of the comb cross, a sheet may be transferred.

Referring to FIGS. 5(A)—(F), the operation of the device will now be described. When the sheets S accumulated on the accumulation support 57 of the second accumulating section 52 have been taken out, the accumulation support 57 is moved to the first position 57A at which the next sheets are to be received (FIGS. 5(A) and (B)).

After accumulation of a group of sheet S onto the first accumulating section 51, the above-mentioned support 55 and the sheet transfer auxiliary roll 56 begin to integrally rotate in the direction of the arrow and the sheets accumulated on the support 55 slide over the support 55 onto the accumulation support 57 of the second accumulating section which crosses now with the sheets S (FIG. 5(C)). During the further rotation of the above-mentioned support 55 and the sheet transfer auxiliary roll 56, the accumulation support 57 which has received the above-mentioned sheets S moves from the first position 57A to the second position 57B (FIGS. 5(D) and (E)).

Next the further rotated sheet transfer auxiliary roll 56 urges the sheets S on the accumulation support 57 against the same accumulation support 57, thereby completing the accumulation of the sheets S onto the accumulation support 57 (FIG. 5(F)). At this time, the above-mentioned sheet transfer auxiliary plate 54 also serves to urge the sheets S against the accumulation support 57. This operation of the sheet transfer auxiliary plate 54 is particularly effective in the case where the size of the sheet S is relatively large or in the case where the sheet S has a convex curl, shown in the drawing.

Figure 6:
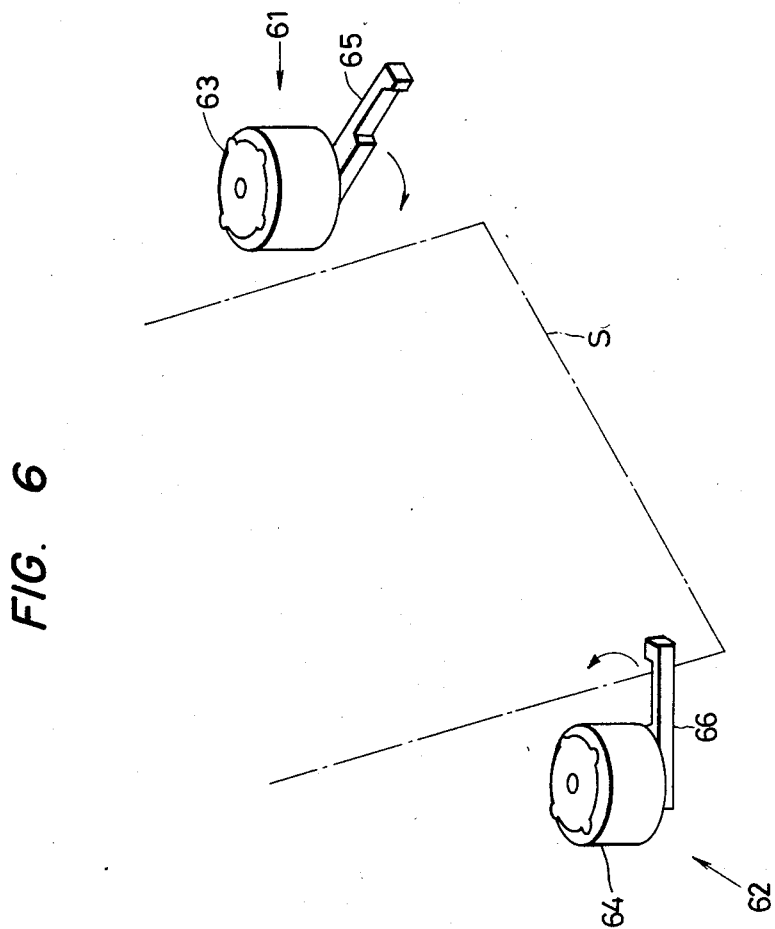
FIG. 6 is a perspective view illustrating a sheet position correction means.

In the latter case, where the sheet has such a curl as mentioned above, the sheets may fall onto the second accumulating section 52, while the sheets are being accumulated onto the first accumulating section 51. It is therefore preferable to provide sheet pressing means adapted to come into/out-of a sheet pressing position, as shwon in FIG. 6, so as to correct the positioning of the accumulated sheets S. The sheet pressing means 61 and 62 as shown in FIG. 6 cause sheet pressing members 65 and 66 to operate so as not to interfere with the sheet accumulating operation of the sheet transporting unit 2, to thereby correct the position of the sheets S.

In the above-described sheet accumulating device having two accumulating sections, it is possible to remove sheets in order they have been received by transferring the sheets, which have been accumulated, to the second accumulating section, and by arranging the second accumulating section to be movable as described above. It is advantageous to ensure space for providing the above-mentioned sheet take-out means or space for removing the sheet take-out means from the device for maintenance or the like.

It should be understood that preferred embodiments have been described as illustrations of the invention. However, the prsent invention includes various modifications and equivalents of the disclosed embodiments. The invention includes all modifications and equivalents of the disclosed embodiments falling within the scope of the appended claims. For example, in the device as shown in FIG. 1, it is possible to arrange the device such that the forward end of the sheet S is detected by a sheet detector provided on the sheet receiver 11 so that the traveling direction of the sheet transporting unit 2 is reversed in response to the detection by such a sheet detector.

As descrived above, according to the present invention, in a sheet accumulating device for accumulating sheets, which are fed at given intervals, in a manner so that the sheets are caused to stand one by one along a slanted guide plate, there is provided sheet receiving means which is arranged such that it receives sheets fed at the transporting speed of the sheets, transports the received sheets along the guide plate into an accumulating position, and then comes back while discharging the sheet to a sheet receiving position, so that the device is remarkably advantageous in that it is possible to sustantially avoid mutual rubbing among the sheets to thereby prevent the sheets from being damaged. The device also permits the various sheets different in size to be reliably accumulated at a predetermined position.

What is claimed is:

1. A sheet material accumulating device for accumulating sheet materials, which are fed at given intervals in a manner so that the sheet materials are caused to stand one by one along a slanted guide plate of a sheet accumulating section, comprising a sheet material transporting means for receiving moving sheet materials from a sheet feed means and transporting the received sheet materials in a first direction along said guide plate into an accumulating position, and means for causing said sheet material transporting means to move in a second direction, opposite said first direction while discharging the sheet materials, said sheet material transporting means comprising driven sheet feeding means for receiving sheet materials and feeding received sheet materials, and drive means for driving said driven sheet feeding means together with the sheet feed means whereby sheets received in said driven sheet feeding means are fed through the sheet material transporting means at a speed proportional to the speed of moving sheets as they are delivered from the sheet feed means.

2. In a sheet material transport and accumulating device which includes a sheet feeding section for feeding sheet materials at a feeding speed in a preselected direction, a sheet transporting section and a sheet accumulating section, said sheet transporting section comprising:

means for receiving said sheet materials at the feeding speed from said sheet feeding section;

first transport means driven together with the sheet feeding section for receiving sheet material at the feeding speed and for transporting received sheet materials at the feeding speed in said preselected direction; and second transport means, independent of said first transporting means, for causing said sheet transporting section to reciprocate between a first position for receiving sheet materials from said sheet feeding section and a second position adjacent said sheet accumulating section;

whereby sheet materials received by said receiving means are transported to a position adjacent said sheet accumulating section as the sheet transporting section transports the sheet materials in the preselected direction from the sheet feeding section and are then withdrawn from said sheet transporting section as it moves in the direction opposite said preselected direction during its reciprocating operation.

3. In a sheet material transport and accumulating device as claimed in claim 2, wherein said first transport means comprises a pair of rolls, a one-way rotating clutch, and a clutch drive means, one roll of said pair of rolls being connected to said rotating clutch to thereby cause said one roll of said pair of rolls to rotate in the one-way directed by said rotating clutch under the control of said clutch and drive means.

4. In a sheet material transport and accumulating device as claimed in claim 3; wherein said sheet transporting section further includes first detector means responsive to the position of received sheet materials, for energizing said second transport means when a received sheet material reaches a predetermined position in said sheet transporting section; and said sheet material transport and accumulating device further comprising a second detector responsive to the position of said sheet transporting section for detecting when said sheet transporting section has reached predetermined limits of travel as it reciprocates between said sheet feeding section and said sheet accumulating section.

5. In a sheet material transport and accumulating device as claimed in claim 4, wherein said sheet accumulating section includes; a first and a second accumulating portions, said first accumulating portion including a first slanted plate, a pivotable sheet transfer auxiliary plate and a sheet transfer roll, and said second accumulating portion including a reciprocating accumulation support.

* * * * *